(12) United States Patent
Peli et al.

(10) Patent No.: US 6,775,060 B2
(45) Date of Patent: Aug. 10, 2004

(54) BIOPTIC TELESCOPE SYSTEM EMBEDDED INTO A SPECTACLE LENS

(75) Inventors: Eliezer Peli, Newton, MA (US); Fernando Vargas-Martin, Murcia (ES)

(73) Assignee: The Schepens Eye Research Institute, Inc., Boston, MA (US)

(*) Notice: Subject to any disclaimer, the term of this patent is extended or adjusted under 35 U.S.C. 154(b) by 266 days.

(21) Appl. No.: 09/916,640

(22) Filed: Jul. 26, 2001

(65) Prior Publication Data

US 2003/0021022 A1 Jan. 30, 2003

(51) Int. Cl.$^7$ .............................. G02B 23/00; G02C 1/00
(52) U.S. Cl. ...................... 359/409; 359/399; 359/431; 351/158
(58) Field of Search .................. 359/363, 390–433, 359/800–818, 831–837, 362; 351/158

(56) References Cited

U.S. PATENT DOCUMENTS

| | | | |
|---|---|---|---|
| 4,704,000 A | * 11/1987 | Pekar et al. | 359/482 |
| 4,704,014 A | * 11/1987 | Carner, Jr. | 351/43 |
| 4,795,235 A | 1/1989 | Spitzberg | 351/158 |
| 5,028,127 A | 7/1991 | Spitzberg | 351/158 |
| 5,283,689 A | * 2/1994 | Carlough | 359/427 |
| 5,321,547 A | 6/1994 | Zapp | 359/431 |
| 5,452,126 A | 9/1995 | Johnson | 359/407 |
| 5,485,305 A | 1/1996 | Johnson | 359/407 |
| 5,541,767 A | 7/1996 | Murphy et al. | 359/399 |
| 5,680,195 A | 10/1997 | Pekar et al. | 351/158 |
| 5,724,163 A | * 3/1998 | David | 359/15 |
| 6,002,517 A | 12/1999 | Elkind | 359/409 |
| 6,065,835 A | 5/2000 | Pekar et al. | 351/158 |
| 6,137,636 A | 10/2000 | Smith | 359/630 |
| 6,204,974 B1 | * 3/2001 | Spitzer | 359/630 |

FOREIGN PATENT DOCUMENTS

FR 2204814 5/1974

* cited by examiner

Primary Examiner—Thong Q Nguyen
(74) Attorney, Agent, or Firm—Weingarten, Schurgin, Gagnebin & Lebovici LLP

(57) ABSTRACT

The invention relates to apparatus and methods for increasing visual acuity through the use of a bioptic telescope which is at least partially embedded in a spectacle lens. In one embodiment, the telescope includes a vision lens having a vision axis and a first surface for placement substantially in front of an eye of a user. The telescope further includes a plurality of optical elements defining an optical path for viewing an object in front of the first surface. At least one of the plurality of optical elements is positioned such that at least a portion of the optical path is located within the vision lens in a plane substantially orthogonal to the vision axis.

13 Claims, 10 Drawing Sheets

BIOPTIC TELESCOPE SYSTEM EMBEDDED INTO A SPECTACLE LENS

FIELD OF THE INVENTION

This invention relates generally to optical devices for improving visual acuity, and more specifically to a telescope system integrated into a spectacle lens.

BACKGROUND OF THE INVENTION

Magnification is useful for individuals who have resolution loss due to defects in the optics of the eye or of the retina, specifically of the fovea (i.e., the central part of the retina) which provides detail vision for reading, facial recognition and other fine discrimination tasks. Bioptic telescope systems have been prescribed for use by the visually impaired for many years. These multi-element devices provide magnified images of objects at further distances as compared to single element lenses that can only provide magnification at very close working distances.

Typically, bioptic telescopes are mounted toward the top of a pair of eyeglasses frames with the telescope eyepiece positioned directly above the pupil of the wearer's eye. This positioning allows the wearer to look under the eyepiece using their unaided vision, and to tip their head downward to sight through the telescope eyepiece to see the magnified image. Bioptic telescopes are available in small, compact Galilean designs that provide narrow fields of view (e.g., about 5 degrees in a 3.0x magnifier) and generally provide relatively dim images. Alternative bioptic telescopes are available in large, heavy Keplerian designs that provide brighter images and fields of view at least twice as wide (e.g., 12 degrees in a 4.0x magnifier) as Galilean designs. Bioptic telescopes are typically mounted through a spectacle (carrier) lens by drilling a hole through it.

Although these types of visual aids can be effectively used in a variety of settings, a large number of visually impaired people reject them. The obvious and unsightly appearance of these prosthetic devices has been identified as one major reason for the reluctance of the visually impaired to use bioptic telescopes.

Previous attempts to improve the cosmetic appearance of bioptic telescopes include the use of very small Galilean telescopes, small mostly behind-the-spectacle-lens Keplerian telescopes, and horizontal telescopes folded above the spectacle lenses. While each of these devices improves the cosmetics of bioptic telescopes, they remain obtrusive and continue to be generally rejected. In addition, conventional attempts at minimization invariably result in optical compromises such as reductions in field-of-view or image brightness, or both.

Low magnification telescopes can be created by combining a high negative power contact lens or intra-ocular (i.e., surgically implanted) lens with a high positive power spectacle lens. While such telescopes are limited in magnification and severely restrict the field-of-fixation they offer an advantage in cosmetic appearance. However, patients also reject these devices due to the unsightly appearance of the high power spectacle lens. A fully implanted intra-ocular telescopic lens is available. It offers the potential of normally looking spectacles and eyes at the cost of a serious surgical procedure, severely reduced field-of-view (but wide open field-of-fixation), dim image, and possible difficulties with future eye care.

What is needed is a low vision bioptic telescope that provides a relatively wide field-of-view, high-magnification, and a bright-image while being cosmetically appealing and permitting the wearer's eye to appear natural.

SUMMARY OF THE INVENTION

The invention relates to bioptic telescopes for increasing visual acuity. In one embodiment, the illustrative telescope includes a vision lens having a vision axis and a first surface for placement substantially in front of an eye of a user. In alternative embodiments, the vision lens can be a carrier lens or a spectacle lens. The telescope further includes a plurality of optical elements defining an optical path for viewing an object in front of the first surface of the vision lens. Additionally, at least one of the plurality of optical elements is positioned such that at least a portion of the optical path is located within the vision lens in a plane substantially orthogonal to the vision axis. In another embodiment, the vision lens further includes a second surface and at least one of the plurality of optical elements is positioned substantially between the first surface and the second surface of the vision lens.

In one embodiment, the user's eye simultaneously views the object through the vision lens and the plurality of optical elements. In another embodiment, the vision lens is a spectacle lens. The telescope further includes an eyeglass frame adapted to retain the spectacle lens. In another embodiment, at least a portion of one of the plurality of optical elements is embedded in the vision lens. In alternative embodiments, at least one of the plurality of optical elements is a lens, a mirror, or a holographic element.

In one embodiment, the plurality of optical elements includes an objective lens, an ocular lens, and a plurality of planar mirrors, the plurality of planar mirrors is adapted to direct the optical path between the objective lens and the ocular lens. The telescope can be a Galilean or Keplerian type telescope. In another embodiment, at least one of the plurality of planar mirrors is located completely within the lens.

The invention is further related to a vision enhancing system. The vision enhancing system includes a spectacle lens having a vision axis and a first surface for placement substantially in front of an eye of a user. The system further includes a telescope in communication with the spectacle lens for viewing an object in front of the first surface of the spectacle lens. The telescope includes an objective lens having an objective lens axis which is substantially parallel to the vision axis. The telescope further includes an ocular lens in optical communication with the objective lens and having an ocular lens axis which is substantially parallel to the vision axis. The telescope further includes a plurality of optical elements defining an optical path between the objective lens and the ocular lens. At least one of the plurality of optical elements is positioned such that at least a portion of the optical path is located within the spectacle lens in a plane substantially orthogonal to the vision axis.

In one embodiment, the spectacle lens further includes a second surface and at least one of the plurality of optical elements is positioned substantially between the first surface and the second surface of the spectacle lens. In another embodiment, the user's eye simultaneously views the object through the spectacle lens and the telescope. In yet another embodiment, an eyeglass frame is adapted to retain the spectacle lens. In still another embodiment, at least a portion of one of the plurality of optical elements is embedded in the spectacle lens. In yet another embodiment the telescope is either a Galilean or Keplerian type telescope.

The invention also relates to a method for constructing a telescope. The method includes the steps of mounting a lens having a vision axis and including a first surface to a frame such that the lens is positioned substantially in front of an eye of a user. The method further includes the step of arranging a plurality of optical elements relative to the lens, such that the plurality of optical elements defines an optical path for viewing an object in front of the first surface. At least one of the plurality of optical elements is positioned such that at least a portion of the optical path is located within the lens in a plane substantially orthogonal to the vision axis. In another embodiment, the step of arranging the plurality of optical elements includes placing an objective lens in optical communication with the lens. In another embodiment, the step of arranging the plurality of optical elements includes placing an ocular lens in optical communication with the lens.

BRIEF DESCRIPTION OF THE DRAWINGS

The above and further advantages of the invention may be better understood by referring to the following description taken in conjunction with the accompanying drawings, in which.

DETAILED DESCRIPTION

In one embodiment, the invention relates to a telescopic device built in part or completely into a carrier lens for increasing visual acuity. In one embodiment, the carrier lens is a spectacle lens. The carrier lens is also referred herein as a "vision lens."
Although the telescope is visible to observers other than the wearer, it does not attract attention due to its compact design. For example, the visibility of the telescope to observers is similar to that of bifocal or trifocal segments in spectacle lenses. In one embodiment, the telescope can be used to simultaneously view the magnified image and the unmagnified image of the same area. This feature improves user orientation and navigation.

Figure 1A:
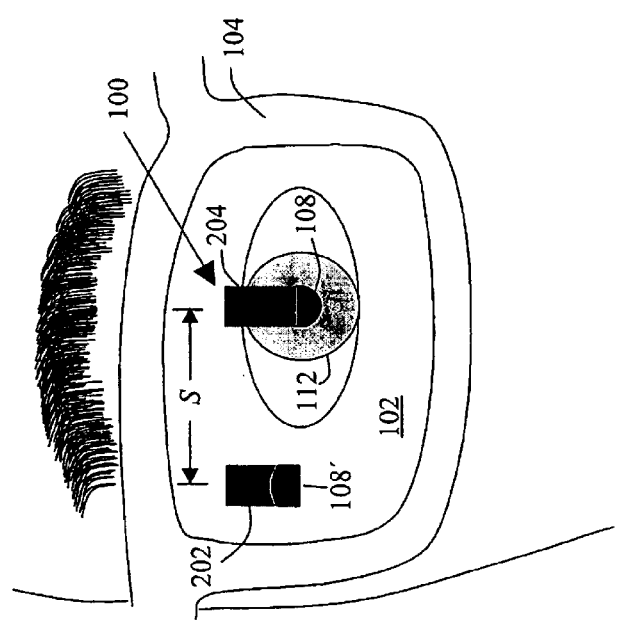
FIG. 1A & FIG. 1B are diagrams of an illustrative Galilean telescope system mounted in an eyeglasses frame and the corresponding view seen by a user through the system, respectively.

FIG. 1A is an illustrative embodiment of a Galilean telescope system 100 embedded in a spectacle lens 102. The spectacle lens 102 is mounted in an eyeglass frame 104 and includes a vision axis which is substantially in the Z-direction. In one embodiment, the vision axis is oriented coincident to the axis of the pupil 108 of a user's eye 112. An ocular mirror 204 is suitably positioned such that it is in front of at least a portion of the user's pupil 108. An objective mirror 202 is in optical communication with the ocular mirror 204 and is located at a predetermined distance S from the ocular mirror 202. A magnified image 108' of the pupil 108 is shown on the objective mirror 202 for clarity. The mirrors 202 and 204 are embedded into the spectacle lens and are adapted to direct an image (not shown) between an ocular lens (not shown) and an objective lens (not shown) such that an optical path between the ocular lens and the objective lens is substantially orthogonal to the vision axis of the spectacle lens 102. In one embodiment, the objective lens and the ocular lens are mounted to the surface of the spectacle lens 102. In another embodiment, at least a portion of the optical path traverses the spectacle lens 102 in a direction that is perpendicular to the vision axis. The width of the mirrors 202 and 204 limits the field-of-view of the telescope 100 in the Y-direction. Skilled artisans will appreciate that the maximum width of the mirrors 202 and 204 is related to the thickness of the spectacle lens 102. The field-of-view in the X-direction can be made relatively large since the length of the mirrors 202 and 204 is limited only by the diameter of the spectacle lens 102. In one embodiment, a combination of curved mirrors (not shown) is embedded into the spectacle lens 102. The curved mirrors perform the function of the objective and ocular lenses in addition to folding the optical path. In another embodiment, the objective and/or the ocular lenses can be replaced with a holographic element adapted to perform the same function. Techniques for embedding optical components in a carrier lens will be discussed in more detail with respect to FIGS. 6A–6C.

Figure 1B:
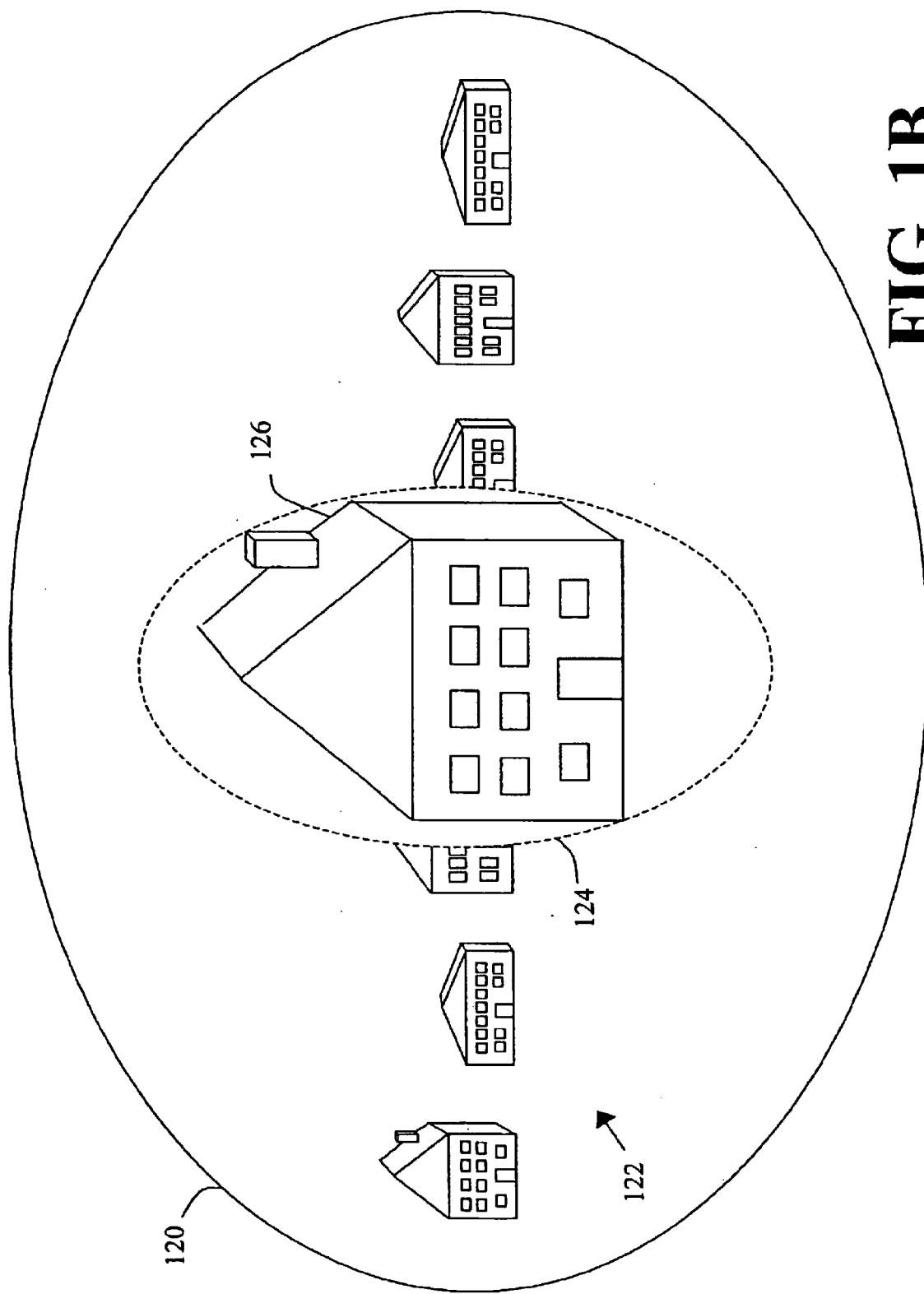
Figures 2A, 2B:
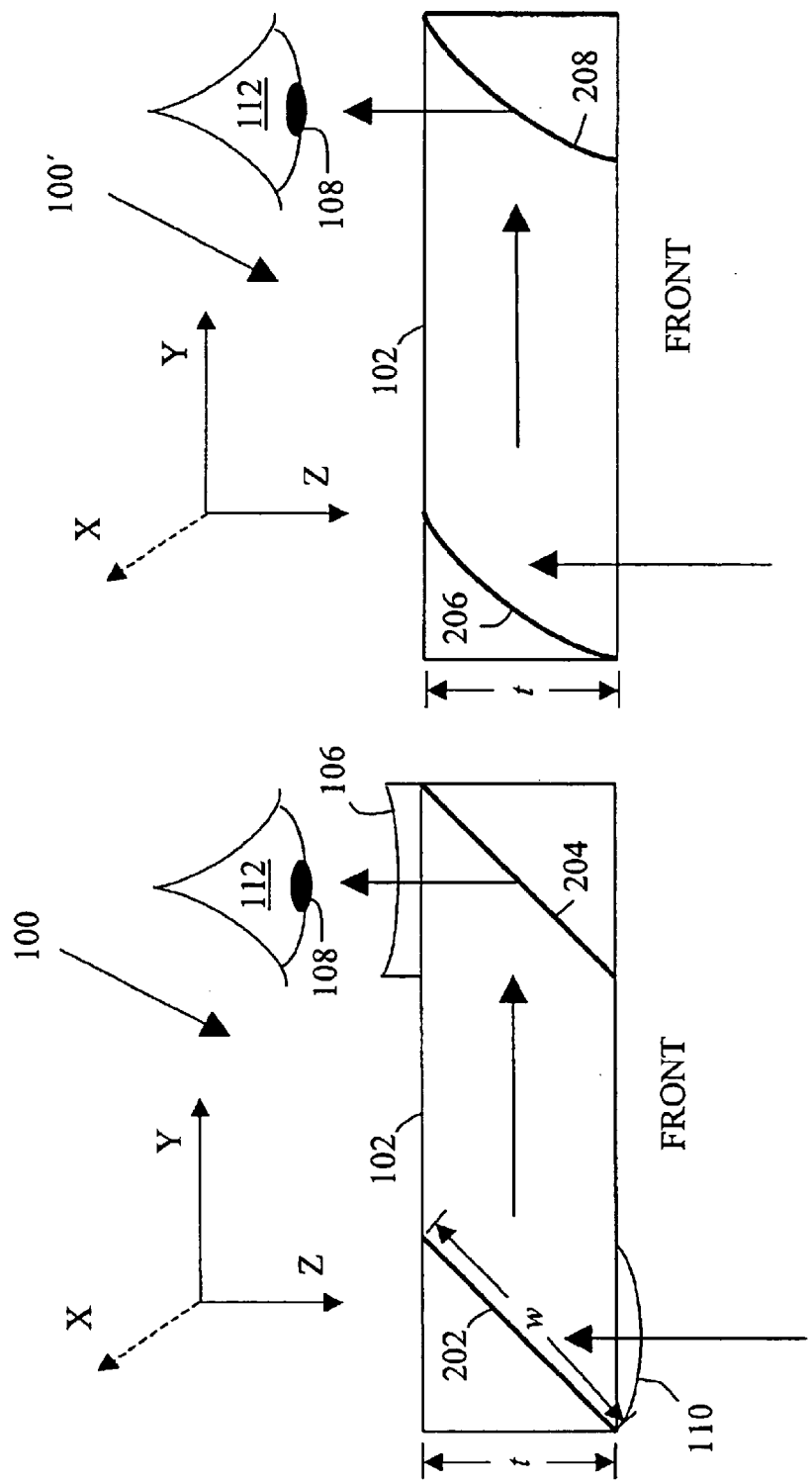
FIG. 2A, FIG. 2B & FIG. 2C are schematic diagrams of illustrative Galilean telescopes according to the present invention.

FIG. 1B illustrates the user's view 120 through the telescopic system of FIG. 2A. The Galilean telescope system 100 allows for the simultaneous viewing of magnified 124 and unmagnified 122 images. Due to the geometry of telescope 100, the simultaneous viewing feature superimposes the magnified image 124 over the unmagnified image 122. The spectacle lens 102 can be adapted to conform to the user's vision-correcting prescription such that the unmagnified image 122 is substantially in focus to the user's eye 112. By providing simultaneous views of the magnified 124 and unmagnified 122 images, the user can easily locate an object 126 or determine his position relative to the object 126.

Figure 1C:
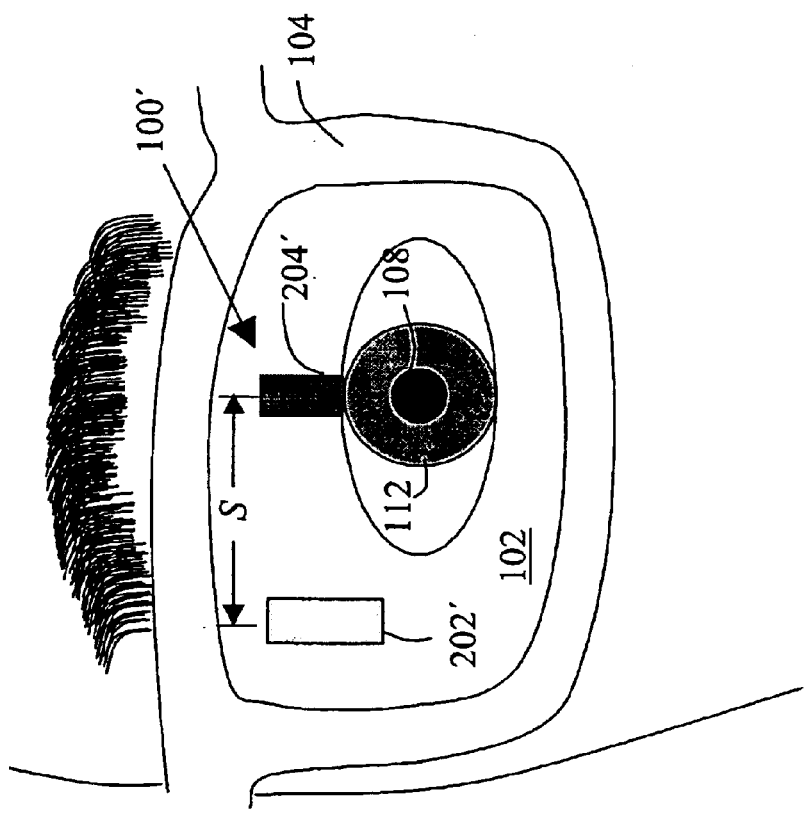
FIG. 1C is a diagram of another illustrative Galilean telescope system mounted in an eyeglasses frame.

FIG. 1C is a diagram of an illustrative Galilean telescope system 100' embedded in the spectacle lens 102. In this embodiment, the ocular mirror 204' is suitably positioned such that it is above the user's pupil 108. The objective mirror 202' is in optical communication with the ocular mirror 204' and is located at a predetermined distance S from the ocular mirror 204'. Since the objective mirror 202', in the normal mode of operation, does not reflect the image of the pupil 108, this embodiment can be more cosmetically appealing. The mirrors 202' and 204' are embedded into the spectacle lens. The mirrors 202' and 204' are adapted to direct an image (not shown) between the ocular lens (not shown) and the objective lens (not shown) as discussed with reference to FIG. 1A. In another embodiment, a combination of curved mirrors (not shown) is embedded into the spectacle lens 102. The curved mirrors perform the function of the lenses in addition to folding the optical path. In another embodiment, objective and/or ocular lenses can be replaced with a holographic element adapted to perform the same function.

In operation, the system 100' functions as follows. In the normal mode of operation, the user observes an unmagnified image through the spectacle lens 102. The spectacle lens can be a prescription lens adapted to correct the user's vision. To magnify the image, the user tilts his head forward and rotates his eye 112 upward until the ocular mirror 204' is in front of at least a portion of his pupil 108. In one embodiment, the user simultaneously observes the magnified and unmagnified images as shown in FIG. 1B.

FIG. 2A is a diagram of a Galilean telescope 100 according to one embodiment of the invention. The telescope 100 includes an ocular lens 106 and an objective lens 110. Planar mirrors 202 and 204 are embedded in the carrier lens 102. In one embodiment, the mirror 202 is referred to as the objective mirror. In another embodiment, the mirror 204 is referred to as the ocular mirror. Each of the mirrors 202 and 204 is oriented at a suitable angle to direct light between the ocular lens 106 and the objective lens 110. In one embodiment, the ocular lens 106 and the objective lens 110 are glued to the carrier lens 102. The mirrors 202 and 204 function as a periscope to fold the optical path from the objective lens 110 to the ocular lens 106. At least a portion of the optical path lies within the carrier lens 102 substantially in the Y-direction.

Figure 2C:
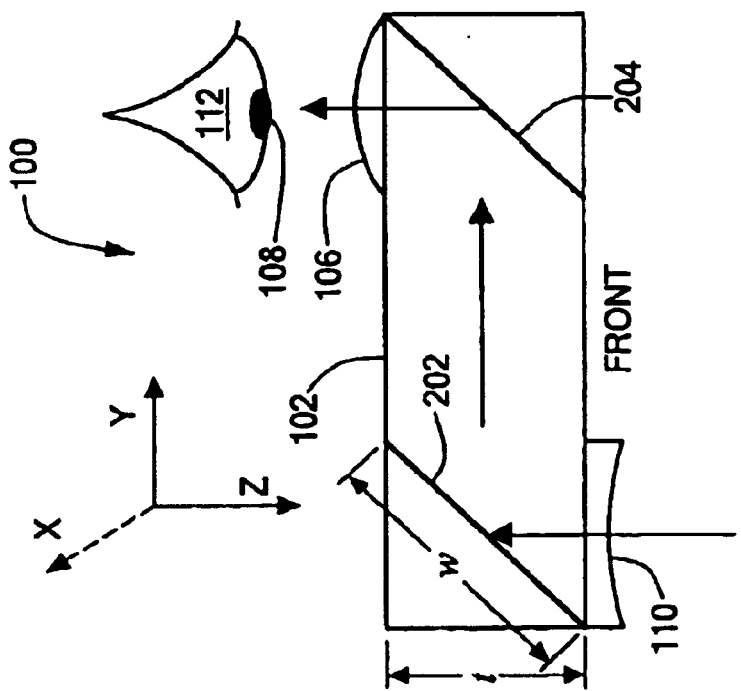

In one embodiment (FIG. 2A), the ocular lens 106 is a negative or concave lens. In another embodiment (FIG. 2C), the ocular lens 106 is a positive or convex lens. The ocular lens 106 is mounted behind the carrier lens 102 slightly above the pupil 108 such that the user can simultaneously see the magnified and unmagnified views. In one embodiment, the position of the ocular lens 106 is near the nasal area of the carrier lens 102. However, skilled artisans will appreciate that the position of the ocular lens 106 is not limited to the region near the nasal area of the carrier lens 102. The objective lens 110 is mounted in front of the carrier lens 102. The objective lens 110 shown in FIG. 2A is a positive or convex lens. In another embodiment (FIG. 2C), the objective lens 110 is a negative or concave lens. The position of the objective lens 110 is determined at least in part by the ocular lens 106. The separation between the ocular lens 106 and the objective lens 110 is predetermined to create substantially an afocal telescope from the two lenses 106 and 110. In one embodiment, the objective lens 110 is positioned at substantially the same vertical or X-position as the ocular lens 106. In another embodiment, the objective lens 110 is separated from the ocular lens 106 in the horizontal or Y-position by a distance S as shown in FIG. 1A. Since the mirrors 202 and 204 fold the optical path inside the carrier lens 102 and not in the air, the computation of the focal lengths of the lenses 106 and 110 is modified accordingly. In yet another embodiment, the powers of the objective lens 110 and/or the ocular lens 106 can be configured to provide minification instead of magnification if desired (e.g., to expand the field-of-view of patients having tunnel vision due to glaucoma). In another embodiment (not shown), the objective lens 110 and/or the ocular lens 106 can be holographic elements adapted to provide the necessary minification.

FIG. 2B illustrates an embodiment of the telescope 100' having optical elements in the form of curved mirrors 206 and 208 embedded into the carrier lens 102. The mirrors 206 and 208 are of sufficient curvature to replace the ocular lens 106 and the objective lens 110. Skilled artisans will appreciate that curved mirrors form images much like lenses. Since the curved mirrors 206 and 208 are totally embedded in the carrier lens 102, this embodiment of the telescope 100' is substantially invisible to a casual observer making it more cosmetically acceptable to patients. One advantage of this embodiment is that the curved mirrors 206 and 208 do not suffer from chromatic aberrations inherent in lenses.

As previously discussed, the field-of-view in the Y-direction of the telescopes of FIG. 2A and FIG. 2B is limited by the width w of the mirror 202. Thus, the field-of-view in the Y-direction is related to the thickness t of the carrier lens 102. The field-of-view in the X-direction can be made relatively large since the dimension of the mirror 202 in the X-direction is only limited by the X-dimension of the carrier lens 102. To increase the field-of-view in the Y-direction, the objective lens 110 can be positioned below the ocular lens 106 in the X-direction (not shown). In this embodiment, the thickness t of the carrier lens 102 limits the field-of-view in the X-direction and increases the field-of-view in the Y-direction. The field-of-view in the Y direction is limited by the physical dimension of the objective lens 110 or by the extent of the carrier lens 102 on the nasal side of the pupil 108.

Figure 3A:
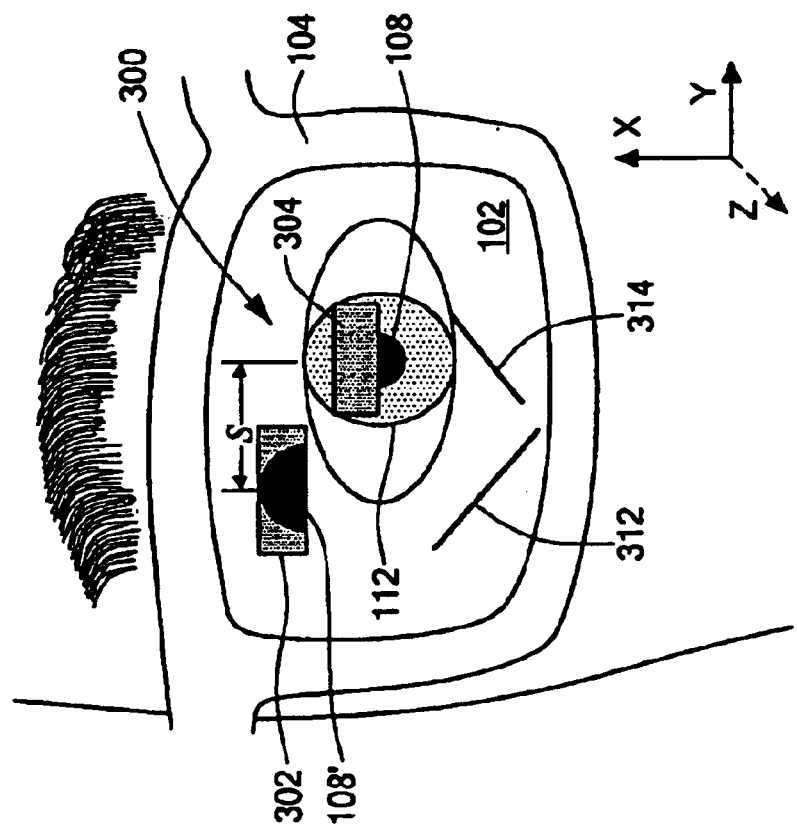
FIG. 3A & FIG. 3B are diagrams of an illustrative Keplerian telescope system mounted in an eyeglasses frame and the corresponding view seen by a user through the system, respectively.

FIG. 3A illustrates a Keplerian telescope 300 according to the present invention. The Keplerian telescope 300 uses a positive power lens for both the objective lens (not shown) and the ocular lens (not shown). An ocular mirror 304 is suitably positioned such that it is in front of at least a portion of the user's pupil 108. An objective mirror 302 is in optical communication with the ocular mirror 304 and is located at a predetermined distance S from the ocular mirror 302. A magnified image 108' of the pupil 108 is shown on the objective mirror 302 for clarity. The image generated by the Keplerian telescope 300 is reversed and can be corrected to permit terrestrial use. This correction is achieved by the addition of two mirrors 312 and 314. In one embodiment, the telescope 300 includes two mirrors 312 and 314 oriented at substantially right angles to each other near the bottom of the carrier lens 102. The two mirrors 312 and 314 contribute to a longer optical path which is necessary for the design of the Keplerian telescope 300.

The telescope 300 also includes an ocular lens (not shown), and an objective lens (not shown). In another embodiment, the design uses a high power lens for the objective lens and a low power lens for the ocular lens to provide minimization as opposed to magnification. The width of the mirrors 302 and 304 limits the field-of-view of the telescope 300 in the X-direction. Skilled artisans will appreciate that the maximum width of the mirrors 302 and 304 in this embodiment is related to the thickness of the spectacle lens 102. The field-of-view in the Y-direction can be made relatively large since the length of the mirrors 302 and 304 is limited only by the diameter of the spectacle lens 102. The telescope 300 having a large field-of-view in the Y-direction allows the user to observe a larger horizontal region in front of him than that of the telescope 100 of FIG. 1A.

Figure 3B:
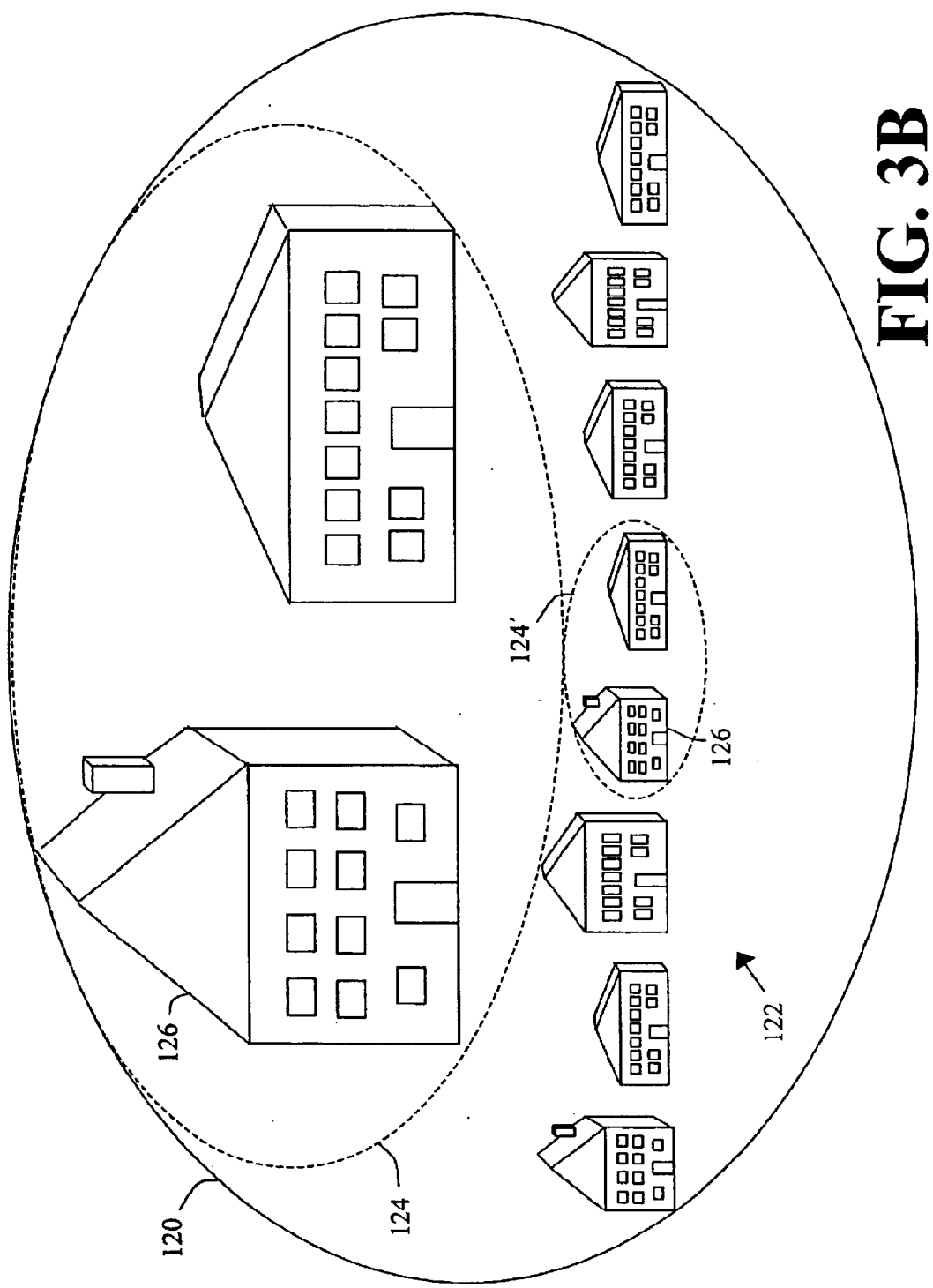

FIG. 3B illustrates the user's view 120 through the telescopic system of FIG. 3A. The Keplerian telescope system 300 allows for the simultaneous viewing of magnified 124 and unmagnified 122 images. By appropriately tilting the ocular mirror 304, the position of the magnified image 124 can be shifted to a desired location. In FIG. 3B, the ocular mirror 304 is tilted such that the magnified image 124 is shifted above the unmagnified image 122. Alternatively, the objective mirror 302 can be tilted to shift the position of the magnified image 124. The shifting of the magnified image 124 prevents the superposition of the magnified image 124 over the unmagnified image 122 as seen in FIG. 1B. The spectacle lens 102 can be adapted to conform to the user's vision-correcting prescription such that the unmagnified image 122 is substantially in focus to the user's eye 112. The field-of-view 124' of the magnified image 124 is shown for clarity. By providing simultaneous views of the magnified 124 and unmagnified 122 images, the user can easily locate an object 126 or determine his position relative to the object 126.

Figure 4A:
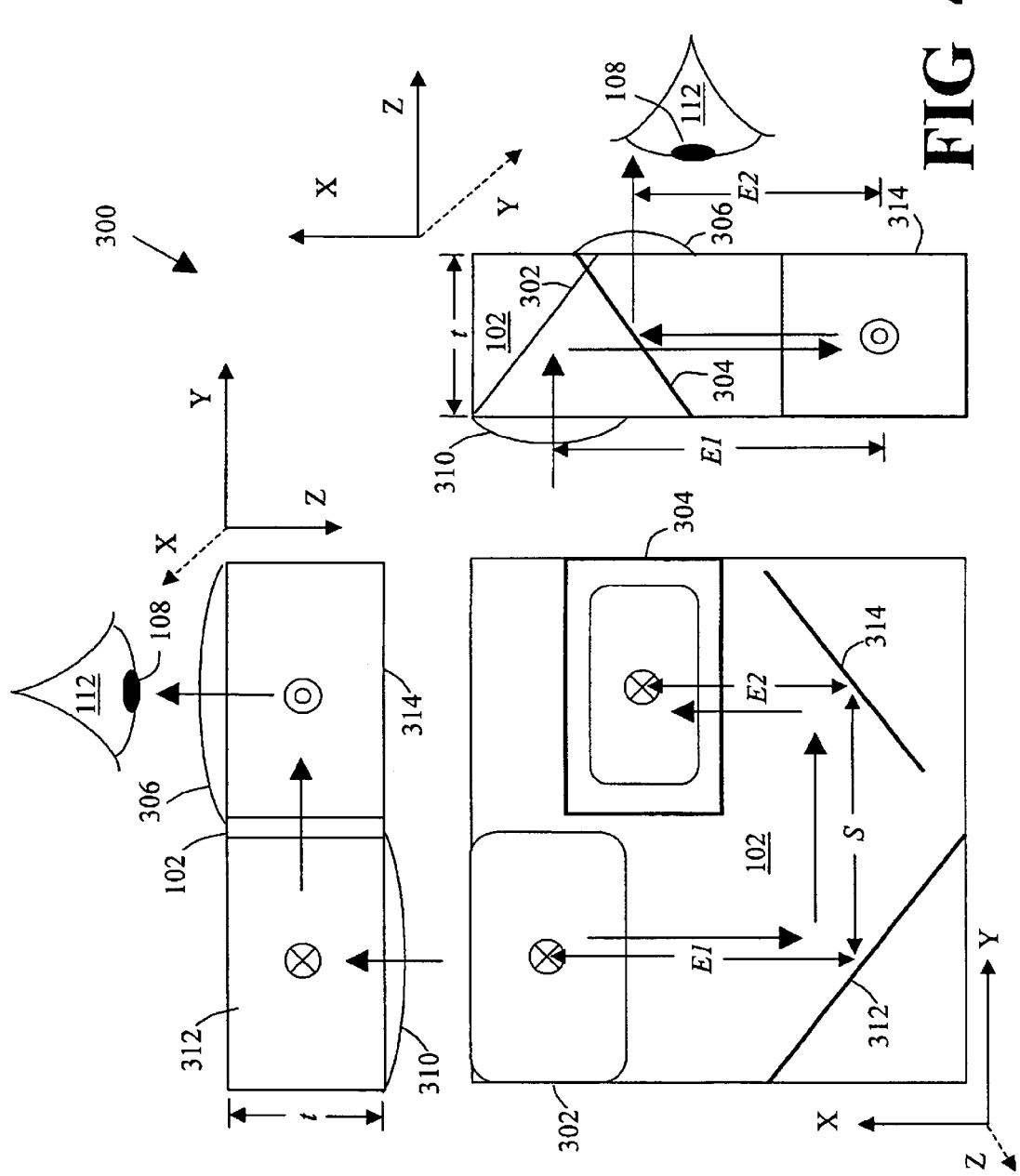
FIG. 4A & FIG. 4B are schematic diagrams of illustrative Keplerian telescope systems according to the present invention.

FIG. 4A illustrates three views of the Keplerian telescope 300 built into a carrier lens 102. In one embodiment, the telescope 300 includes an ocular lens 306 and an objective lens 310. The ocular lens 306 and the objective lens 310 can be glued to the carrier lens 102. In one embodiment, the ocular lens 306 is located at a position on the carrier lens 102 such that the user can simultaneously view both the magnified and unmagnified images. The telescope also includes an ocular mirror 304 and an objective mirror 302. The objective mirror 302 directs an image into the telescope 300 and the ocular mirror 304 directs the image into the ocular lens 306. In one embodiment, the ocular mirror 304 and the objective mirror 302 are embedded into the carrier lens 102. The telescope 300 also includes two planar mirrors 312 and 314. In one embodiment, the two planar mirrors 312 and 314 are embedded in the carrier lens 102. In another embodiment, one or more field lenses (not shown) can be placed in the optical path of the telescope 300. In another embodiment (not shown), at least one of the optical elements can be replaced with a holographic element.

The telescope 300 operates as follows. A user deploying the telescope 300 can simultaneously view both the unmagnified and magnified images. Since the carrier lens 102 is relatively shallow in thickness t, the optical elements that provide the imaging must be relatively small while providing nearly perfect imaging, desired magnification, and producing the image inversion. In one embodiment, the ocular lens 306 and the objective lens 310 are chromatically corrected. In another embodiment, additional field lens elements (not shown) can be added to chromatically compensate the ocular lens 306 and/or the objective lens 310.

The mirror 302 directs light entering the objective lens 310 in the negative X-direction to the mirror 312, which directs the light to the mirror 314 in the Y-direction. The mirror 314 then directs the light in the positive X-direction to the mirror 304, which then directs the light through the ocular lens 306 in the Z-direction. In one embodiment, the mirror 312 is disposed at substantially a right angle to the mirror 314. A distance scale (not shown) can be provided on or embedded in the carrier lens 102 for estimating distance. The distance scale is located such that a user can simultaneously view the distance scale and the magnified image. This can be useful in many applications, such as estimating the distance to the Pin while playing golf.

As previously discussed, the telescope 300 allows a user to simultaneously view the magnified image and the unmagnified image. In one embodiment, the simultaneous vision concept requires that the magnified image seen through the telescope 300 be visible simultaneously with the unmagnified image and be projected above the unmagnified view as shown in FIG. 3B. Alternatively, the magnified image can be shifted in other directions. However, shifting the magnified image above the unmagnified image is preferred because the magnified image occupies an area of the carrier lens 102 that is less likely to include obstacles. In alternative embodiments, the shifting of the magnified image is accomplished by appropriately tilting the ocular mirror 304 and/or the objective mirror 302. The telescope 300 according to the present invention achieves the simultaneous view in part because there is no opaque frame or mounting structure to block the unmagnified view from reaching the pupil 108. Furthermore, by tilting the ocular mirror 304 slightly, the magnified image can be projected to appear to be above the unmagnified image. The Keplerian telescope 300 including a field-of-view having limited height is especially suited to the mode of operation in which the magnified view appears above the unmagnified view.

Figure 4B:
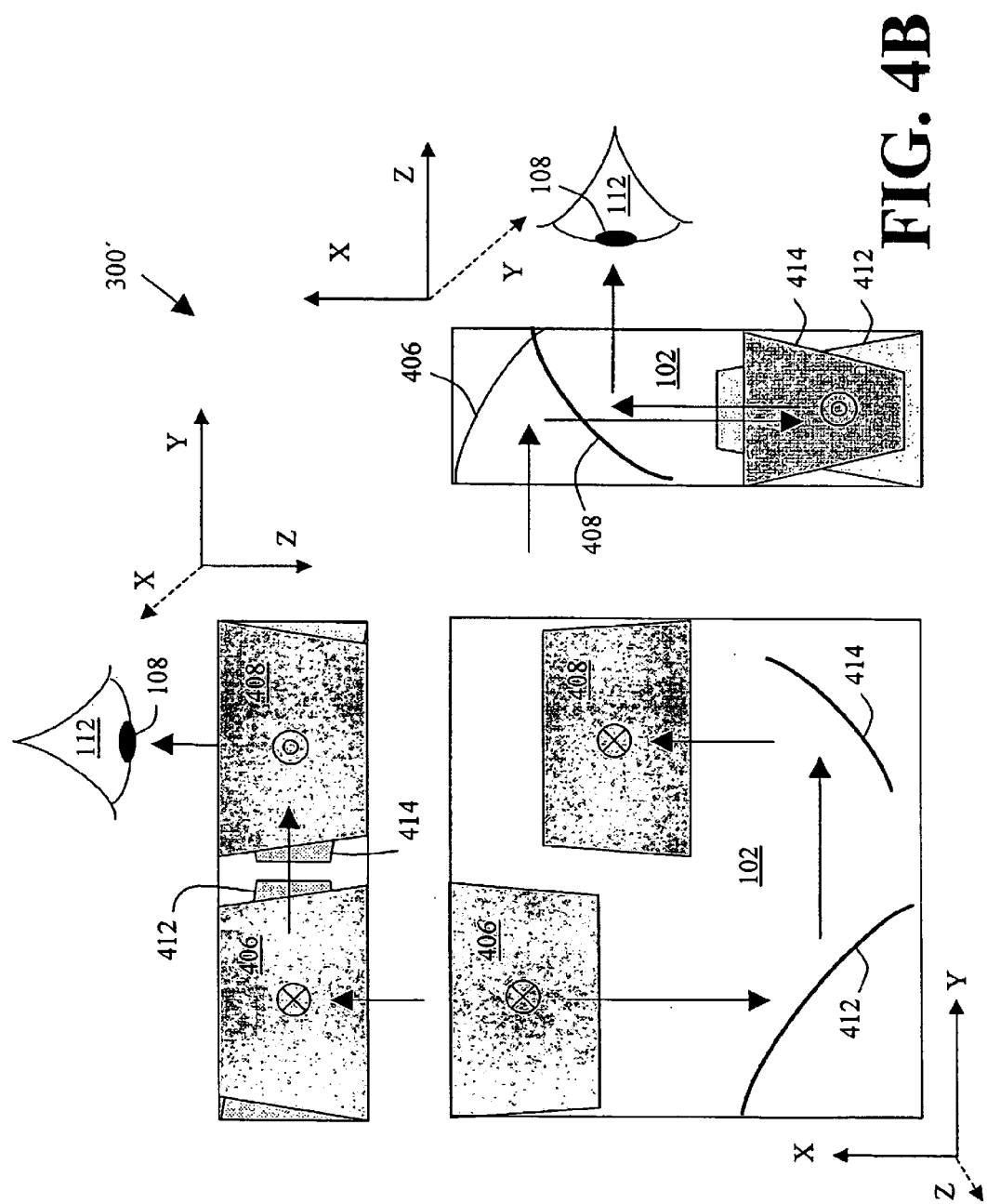

FIG. 4B illustrates three views of a Keplerian telescope 300' having curved mirrors embedded into a carrier lens 102. In one embodiment, the telescope 300' includes a curved ocular mirror 408 and a curved objective mirror 406. The curved mirrors 408 and 406 behave as lenses and do not suffer from the chromatic aberrations inherent in lenses. In one embodiment, the curved ocular mirror 408 is located at a position on the carrier lens 102 such that the user can simultaneously view both the magnified and unmagnified images. The telescope 300' also includes two mirrors 412 and 414. The mirrors 412 and 414 can be curved to improve the performance of the telescope 300'. In this embodiment, the curved mirrors 412 and 414 act as field lenses without the aberrations inherent in standard lenses. Additionally, the mirrors 412 and 414 invert the magnified image for terrestrial use. In alternative embodiments, one or more of the curved mirrors 406, 408, 412, and 414 are embedded into the carrier lens 102. In other embodiments, the telescope 300' includes additional optical elements (not shown) disposed in the optical path of the telescope 300'.

Design considerations for the telescope 300 of FIG. 4A will be discussed next. The optical path length $\overline{L}$ in the Keplerian telescope 300 is equal to the sum of the focal lengths of the objective lens 310 and the ocular lens 306.

$$\overline{L} = f'_{ob} + f'_{oc} \tag{1}$$

The power or magnification M of the telescope 300 is given by the ratio of the focal length of the objective lens 310 to the focal length of the ocular lens 306.

$$M = \frac{|f'_{ob}|}{|f'_{oc}|} \tag{2}$$

The optical path length $\overline{L}$ can be expressed as follows.

$$\overline{L} = (M+1)f'_{oc} \tag{3}$$

Thus, for a given focal length of an ocular lens 306, a longer optical path length $\overline{L}$ can achieve higher magnification M. Skilled artisans will appreciate that the optical path length $\overline{L}$ is computed using the refractive index n of the medium (e.g., for a plastic carrier lens having n≈1.5). The refractive index n of the medium affects the focal lengths of the lenses 310 and 306. For example, in one embodiment, the physical length L of the optical path is greater by fifty percent in the medium of the carrier lens 102 than it would be in a design using an air medium. Thus, the optical path length $\overline{L}$ in this embodiment can be expressed as follows:

$$\overline{L} = \frac{L}{n} = \frac{t + E1 + S + E2}{n} \tag{4}$$

where t is the thickness of the carrier lens 102 and L is the physical length of the optical path. Another consideration in the design of the Keplerian telescope 300 is the eye relief (i.e., the distance from the ocular lens 106 to the eye 112). This parameter affects both the field-of-view and the light efficiency of the telescope 300. In one embodiment, the exit pupil (i.e., the image of the objective lens 110 through the ocular lens 106) is coincident with the entrance pupil 108 of the eye 112 (e.g., e=15 mm behind the carrier lens 102). This provides maximum efficiency and field-of-view. If a field lens is not included in the embodiment, the exit pupil can be expressed as follows.

$$e = f'_{oc} + \frac{f'^2_{oc}}{f'_{ob}} = f'_{oc}\frac{M+1}{M} \quad (5)$$

Thus, the optical path length $\overline{L}$ can be expressed as follows.

$$\overline{L} = e \cdot M \quad (6)$$

Figure 5:
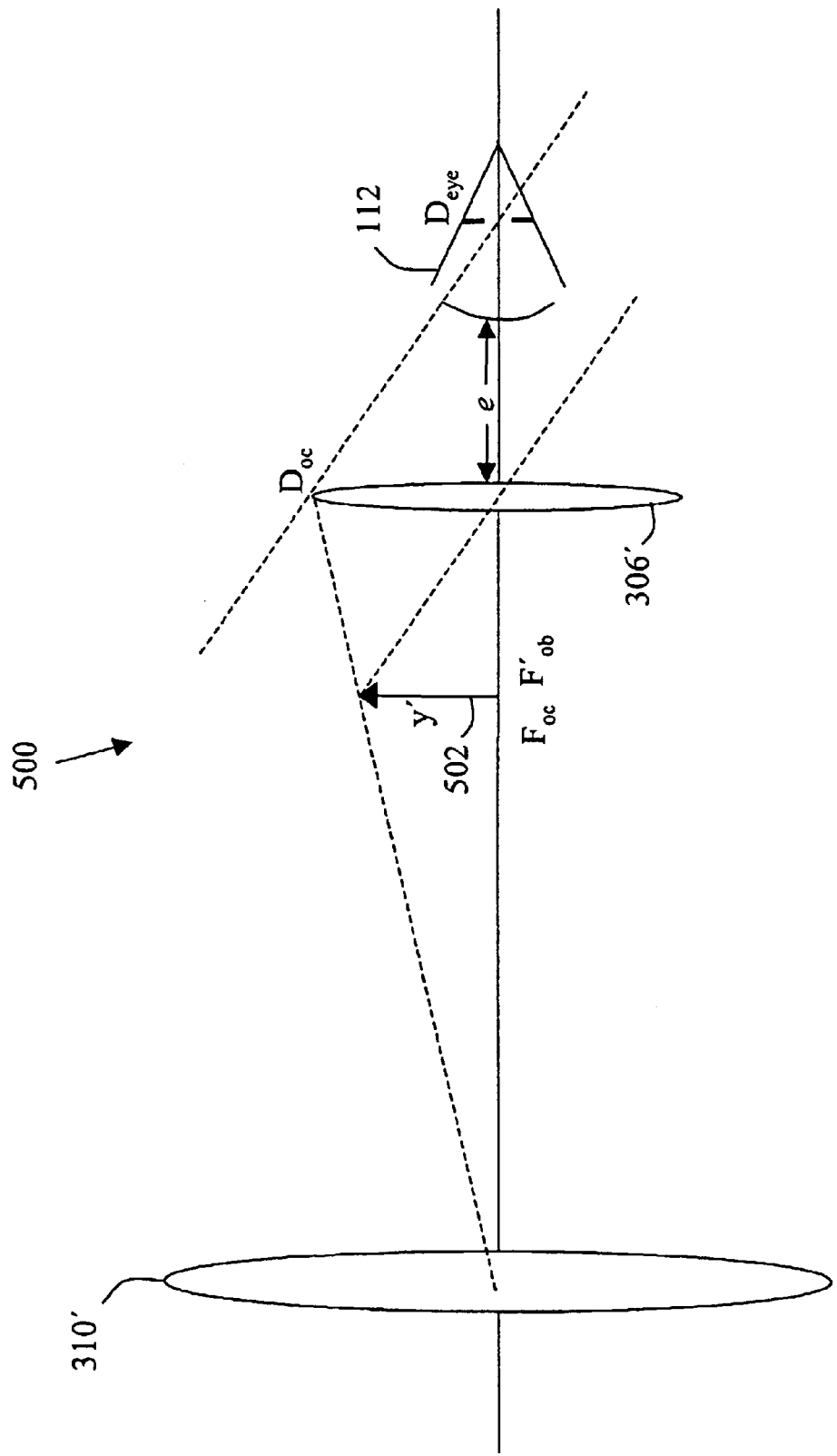
FIG. 5 is a diagram illustrating a telescope having two lenses.

The field-of-view of the telescope 300 can be calculated with reference to FIG. 5. FIG. 5 illustrates a telescope 500 having an objective lens 310' and an ocular lens 306'. The intermediate image 502 is disposed at a distance $F'_{ob}$ from the objective lens 310' and a distance $F_{oc}$ from the ocular lens 306'. This arrangement is said to be afocal since the two lenses 310' and 306' are separated by a distance equal to the sum of their focal lengths. The size of the intermediate image 502 of the largest viewable image at $F'_{ob}$ is shown as y' The visual field is therefore given by $2y'/f'_{oc}$, where $f'_{oc}$ is the focal length of the ocular lens 306'. The field-of-view is typically defined for the point of half illumination, under the assumption of a small pupil 108. The field-of-view can be expressed as:

$$2y' = f'_{oc}\frac{D_{oc}}{e} \quad (7)$$

Hence, the focal length $f'_{oc}$ and the diameter $D_{oc}$ of the ocular lens 306' as well as the eye relief e, determine the size of the field-of-view. Depending on the size of the pupil 108, a range of field-of-views can be derived as follows.

$$2y' = f'_{oc}\frac{D_{oc} \pm D_{eye}}{e} \quad (8)$$

This range is centered about the half-illumination field. It will be appreciated by skilled artisans that the half-illumination field refers to the size of the field for which the illumination near the edge of the field decreases to one-half of the illumination near the center of the field.

Figures 6A, 6B, 6C:
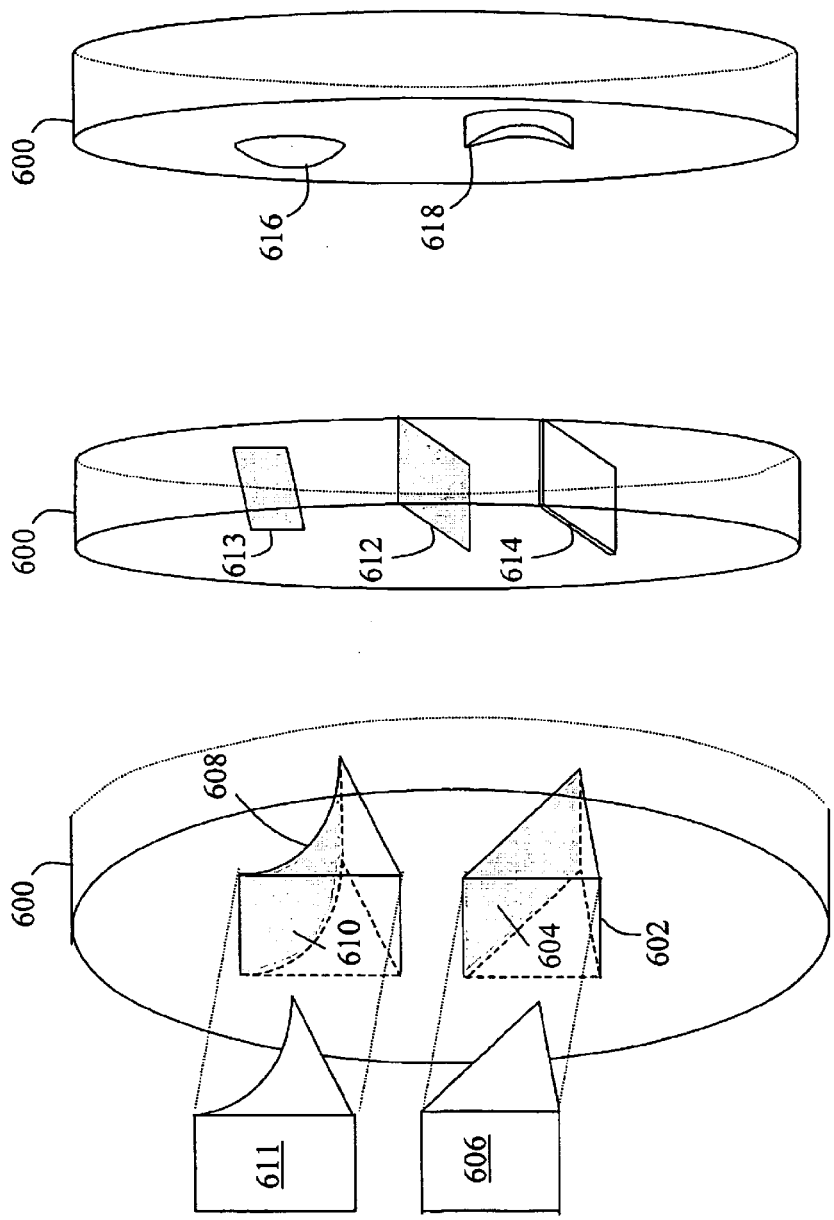
FIGS. 6A–6C are diagrams of various methods for attaching and/or embedding optical elements to a carrier lens.

FIG. 6A illustrates one technique available to embed optical elements or optical components into a carrier lens 600. In one embodiment, a wedge-shaped cut 602 having the desired angles and dimensions is made into the carrier lens 600. An interior surface 604 of the wedge-shaped cut 602 is then coated with metallic or dielectric layers, for example. The coated interior surface 604 functions as a planar mirror. To reinforce the carrier lens 600, a wedge-shaped section 606 having the proper dimensions can be inserted and glued into the wedge-shaped cut 602. Although not required to practice the invention, the wedge-shaped section 606 reinforces the carrier lens 600 and protects the coated interior surface 604 from debris, for example. The wedge-shaped section 606 can be fabricated from a suitable material. The material can be substantially transparent such that the affixed wedge-shaped section 606 appears to be integral to the carrier lens 600. In alternative embodiments, the material is a flexible material such as silicon sealant, glue such as epoxy resin, or resin from which the carrier lens 600 is made.

In another embodiment, a curved-shaped cut 608 having the desired dimensions is made into the carrier lens 600. An interior surface 610 is then coated with metallic or dielectric layers, for example. The interior surface 610 functions as a curved mirror. An optional curve-shaped section 611 can be affixed to the interior surface 610. Skilled artisans will appreciate that cuts of any shape or orientation can be made in the carrier lens without departing from the scope of the invention.

FIG. 6B illustrates another technique available to embed optical elements or optical components into a carrier lens 600. In one embodiment, thin plates 612, 613 and 614 are molded into the carrier lens 600 at desired positions. The plates 612, 613, and 614 can be coated with a metallic film, for example. In another embodiment, a precise cutout 614 can be made into the carrier lens. A mirror or other optical component can be inserted into the cutout 614 and affixed to the carrier lens.

FIG. 6C illustrates a technique available to affix optical components to a carrier lens 600. In one embodiment, a convex lens 616 and a concave lens 618 are glued to the carrier lens 600 using suitable optical glue. In another embodiment (not shown) the lenses 616 and 618 are injected molded into the carrier lens 600. Skilled artisans will appreciate that other techniques of embedding, attaching, and combining optical elements can be used without departing from the spirit and scope of the invention.

In another embodiment, one or more field lenses (not shown) are included in the Keplerian telescope 300. Skilled artisans will appreciate that the introduction of field lenses distributes optical power, thus, reducing the need for high power at the ocular lens 306. In addition, field lenses can also increase the field-of-view of the telescope 300. These optical elements can be formed within the carrier lens 102 by various techniques such as injection molding.

Having described and shown the preferred embodiments of the invention, it will now become apparent to one of skill in the art that other embodiments incorporating the concepts may be used and that many variations are possible which will still be within the scope and spirit of the claimed invention. These embodiments should not be limited to disclosed embodiments but rather should be limited only by the spirit and scope of the following claims.

What is claimed as new and secured by Letters Patent is:

1. A spectacle system providing both magnified and non-magnified distance vision to a user, said system comprising:
    a spectacle lens having a vision axis, said spectacle lens comprising a first surface and a second surface; and
    four or more optical elements comprising a telescope and defining an optical path for viewing an object in front of said spectacle lens, at least two of said optical elements being positioned such that at least a portion of said optical path is located within said spectacle lens between said first and second surfaces and is substantially orthogonal to said vision axis,
    wherein said optical elements comprising said telescope occupy only a portion of said spectacle lens, wherein said portion of said spectacle lens occupied by said telescope provides said magnified distance vision and a portion of said spectacle lens not occupied by said telescope provides said non-magnified distance vision, and wherein said user can simultaneously or alternately view said object through said portion providing said magnified distance vision and said portion providing said non-magnified distance vision.

2. The spectacle system of claim 1, said spectacle lens further comprising a refractive correction.

3. The spectacle system of claim 2, wherein said non-magnified portion of said spectacle lens comprises said refractive correction.

4. The spectacle system of claim 1, wherein at least one of said optical elements defining said telescope is positioned in said spectacle lens, substantially between said first surface and said second surface.

5. The spectacle system of claim 1, wherein at least a portion of one of said optical elements is embedded in said spectacle lens.

6. The spectacle system of claim 1, wherein at least one of said optical elements defining said telescope is a lens.

7. The spectacle system of claim 1, wherein at least one of said optical elements defining said telescope is a mirror.

8. The spectacle system of claim 7, wherein said mirror is at about 45 degrees to said vision axis.

9. The spectacle system of claim 7, wherein said mirror is curved.

10. The spectacle system of claim 1, wherein at least one of said optical elements defining said telescope is a holographic element.

11. The spectacle system of claim 1, wherein said optical elements defining said telescope comprise an objective lens, an ocular lens and a plurality of mirrors, said plurality of mirrors adapted to direct said optical path between said objective lens and said ocular lens.

12. The spectacle system of claim 11, wherein at least one of said plurality of mirrors is located completely within said spectacle lens.

13. The spectacle system of claim 11, wherein said objective lens is a negative or concave lens.

* * * * *

UNITED STATES PATENT AND TRADEMARK OFFICE
CERTIFICATE OF CORRECTION

PATENT NO.    : 6,775,060 B2
DATED         : August 10, 2004
INVENTOR(S)   : Eliezer Peli et al.

It is certified that error appears in the above-identified patent and that said Letters Patent is hereby corrected as shown below:

Column 1,
Line 3, insert the following paragraph:
-- STATEMENT REGARDING FEDERALLY SPONSORED RESEARCH OR DEVELOPMENT --.
Research leading to this invention was sponsored by NIH Grant No. EY12890, and therefore, the U.S. Government has certain rights to the invention. --; and Column 4,
Line 31, "FIG. 2A" should read -- FIG. 1A --.

Signed and Sealed this

Twenty-eighth Day of March, 2006

JON W. DUDAS
*Director of the United States Patent and Trademark Office*